March 19, 1963    S. J. BEGIN    3,082,019
SAFETY JACKKNIFE DEVICE FOR TRACTOR-TRAILER VEHICLES
Filed April 6, 1961    2 Sheets-Sheet 1
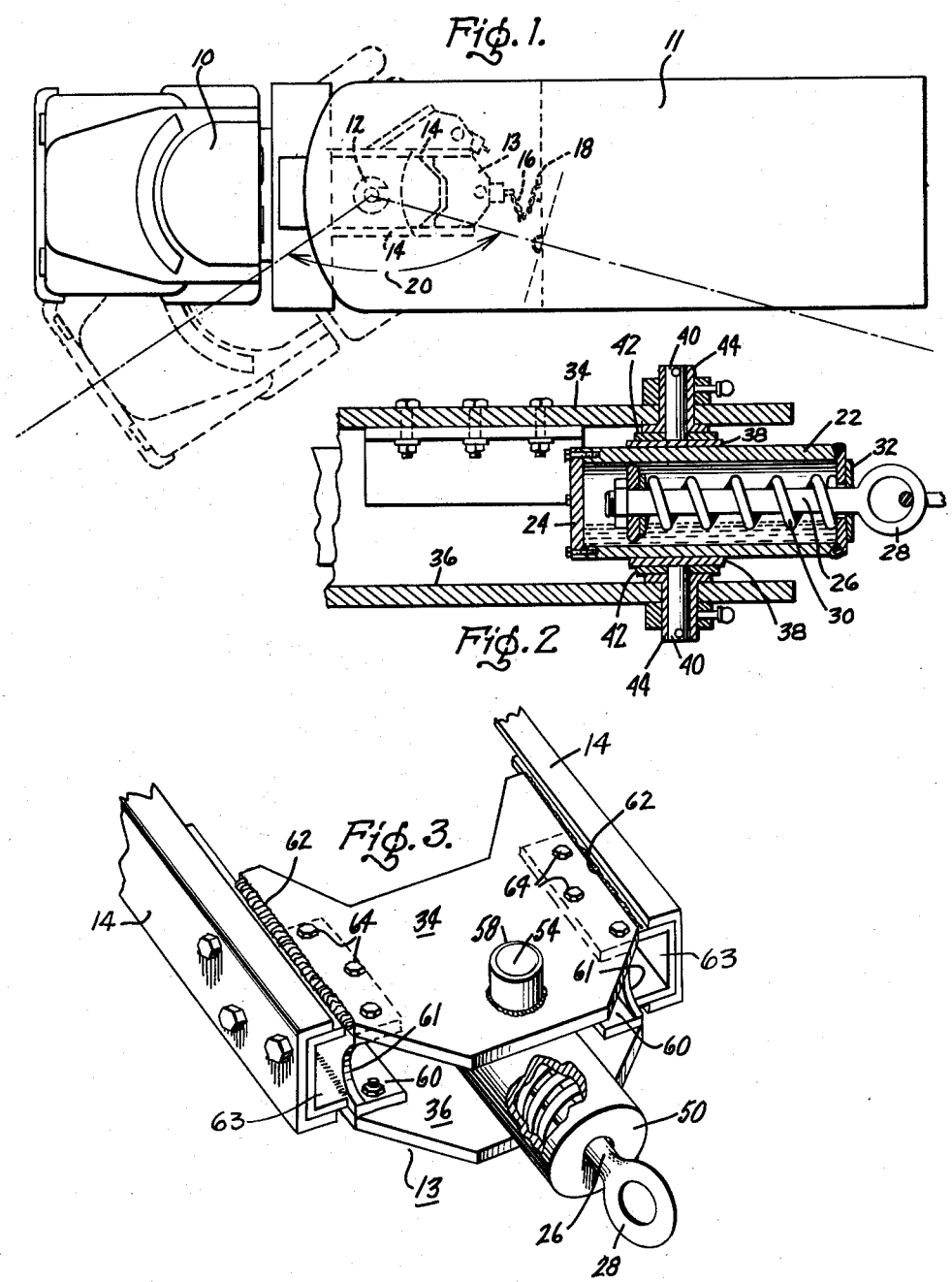
INVENTOR.
Sylvio J. Begin
BY James R. Campbell
His Attorney March 19, 1963 S. J. BEGIN 3,082,019
SAFETY JACKKNIFE DEVICE FOR TRACTOR-TRAILER VEHICLES
Filed April 6, 1961 2 Sheets-Sheet 2
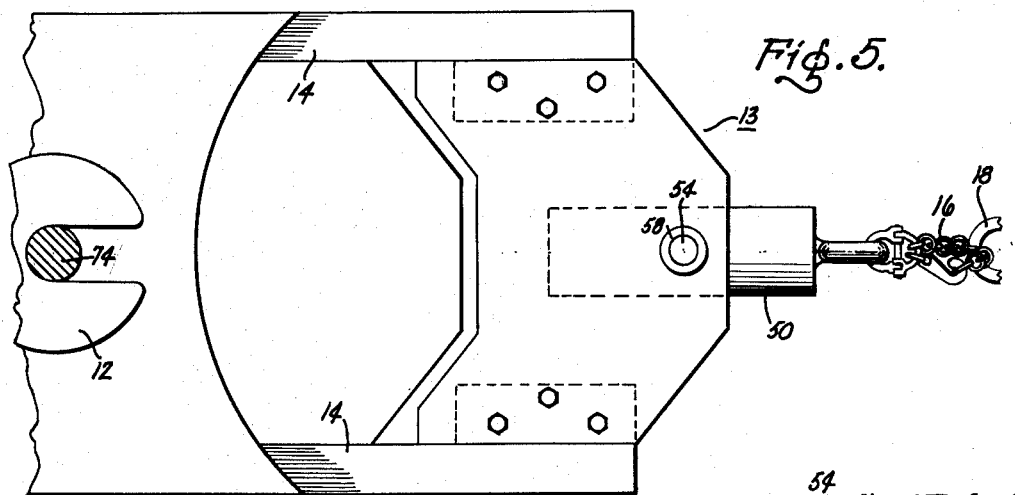
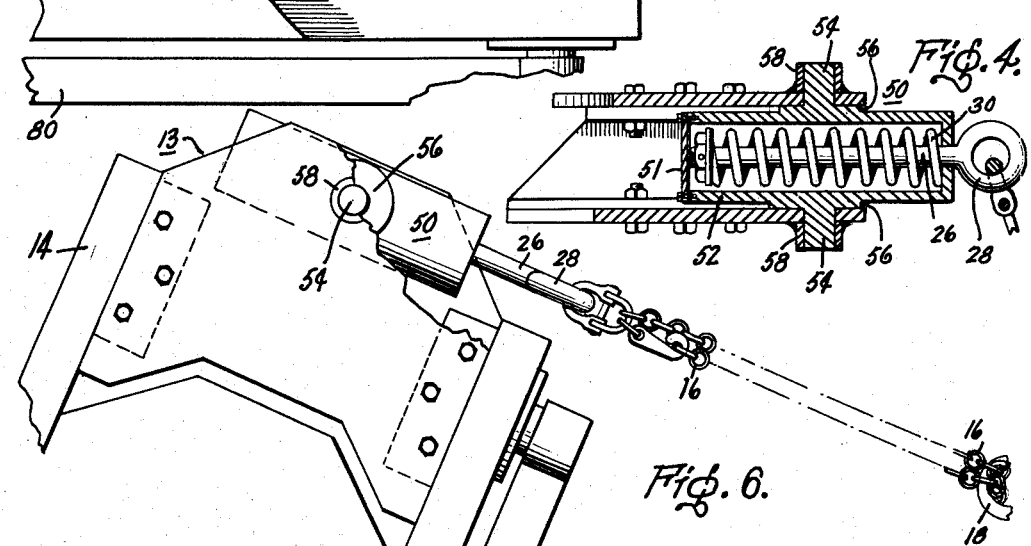
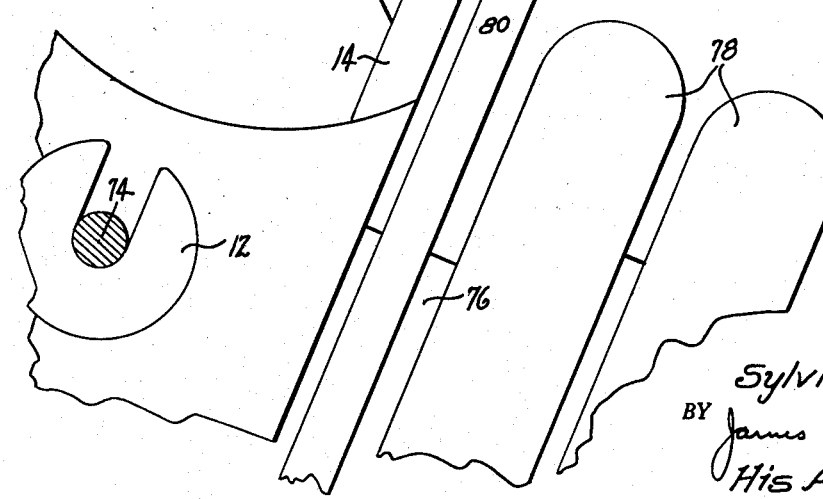
INVENTOR.
Sylvio J. Begin
BY James R. Campbell
His Attorney

# 3,082,019
SAFETY JACKKNIFE DEVICE FOR TRACTOR-TRAILER VEHICLES
Sylvio J. Begin, Schenectady, N.Y., assignor to K & W Manufacturing Company, a corporation of New York
Filed Apr. 6, 1961, Ser. No. 101,118
5 Claims. (Cl. 280—432)

The invention described herein relates to safety-jackknife devices and particularly to those especially designed for use with tractor-trailer trucks for preventing the trailer from exceeding a predetermined angle with respect to the pulling tractor when the vehicle skids or otherwise enters an out of control condition.

Prior recognition of the hazards to which truck drivers are subjected when driving on icy or wet pavements led to extensive developmental activities in an effort to find a suitable device incorporating the safety features necessary for assuring safe driving. This work culminated in the inventions described in my previously issued United States Patents 2,822,188 and 2,838,325. As disclosed, particularly in the former patent, the apparatus generally comprises a cylinder mounted between a pair of parallel plates attached to the frame of the tractor. An eye bolt having a strong spring encompassing its shaft is positioned within the cylinder and a heavy chain then interconnects the eye of the bolt with a U-type bracket welded on the forward part of the trailer frame. The design and disposition of the parts are such that when the trailer moves out of alignment with the pulling tractor, the chain tightens and commences compressing the spring, and when full compression and maximum allowable angle between the tractor and trailer is reached, further movement toward each other is precluded. This action effectively limits the angle between the tractor and trailer, prevents their engagement with each other and protects not only the driver but the cargo as well.

A further important advantage inherent in the construction which is distinct from that described above, is that the trailer at all times is connected positively to the tractor by the chain. Should the trailer inadvertently become detached from the tractor, the chain acts to prevent the parts from becoming disengaged.

Although the above constructions have proven extremely successful in operation, experience gained under actual manufacturing and operation conditions has shown that the need exists for an improved safety-jackknife device more economical of manufacture than that presently being made.

The design disclosed in Patent 2,822,188 for carrying out the above described function requires expenditure of about 3½ to 4 times the material costs for labor to provide a finished product, not including installation and other overhead costs. Close examination of this patented construction, including the process of assembly, indicated that decided cost advantages could be realized if a complete redesign of the parts were made. Referring to FIGURES 1 and 2 of the present drawings, which are substantially duplicates of that shown in Patent 2,822,188 it will be seen that the vehicle comprises a tractor 10 connected with a trailer 11 at the fifth wheel 12 mounted on the tractor in a conventional manner. The safety-jackknife device 13 is mounted between the rearwardly extending frame members 14 on the tractor. A chain 16 interconnecting the device with a U-shaped bracket 18 welded to the trailer 11 is adjustable for limiting the maximum angle 20 (shown in dotted lines) that the tractor can make with the trailer when the vehicle is in operation.

Referring specifically to FIGURE 2 illustrating the prior art design, present practices include cutting the cylinder 22 to the desired length from standard size pipe. After both ends are machined, one of the ends must be beveled for subsequent welding while the other is drilled and tapped for accepting cover plate 24. The shaft 26 of eye bolt 28 is arranged for axial and transverse movement in cylinder 22 against the action of spring 30 when the trailer moves out of alignment with the tractor. The most economical practice for making the cover plate 32 is to cut a disc of the desired size from heavy sheet material prior to turning it in a lathe to obtain a diameter equal to the outer diameter of the cylinder. An elongated hole then is cut in the cover plate to allow unimpeded movement of the shaft in the cylinder.

The shaping and machining of these parts associated with the cylinder is carried out by following the most economical practices, but the costs in terms of labor necessary for developing the product are extremely high, particularly when compared with the costs for material.

In order to position the cylinder 22 for rotary movement in a housing comprising upper and lower supporting plates 34 and 36, a pair of collars or shoes 38 are cut and shaped to snugly fit the rounded configuration of the cylinder 22. Pins 40 are located in holes provided in spacers 42 and in the collars, and the parts assembled with the cylinder to form the construction shown in this figure. When the pins, collar and cylinder are all welded together simultaneously, the heat imparted to the parts plus cooling of the weld material moves the pins from their initially aligned positions on the cylinder. Since the pins must support the cylinder in bearing 44, they are machined to the required diameter while simultaneously bringing them into exact alignment with a plane extending transverse to the cylinder axis. As in the case of the cylinder, the parts which hold the cylinder in position must be tailor made and extreme care is required during machining to assure an accurate fit when assembled in the housing.

Moreover, still additional material and labor costs are involved in manufacturing plates 34 and 36 comprising the housing for the device. These plates presently are cut to different sizes from large sheets of steel to fit different size frames on various makes of trailers. Because of the variation in plate dimensions, substantial wastage results in each sheet of steel. Obviously, considerable time is required to measure and cut each plate from the steel stock.

Consideration of the above described process for preparing and assembling the safety-jackknife device shows that a multitude of parts must be individually fashioned prior to welding them into a complete unit. The rugged duty to which the device is subjected requires the use of heavy structural members thus requiring valuable time for setting up lathes and then machining the parts to close tolerances necessary for efficient and trouble-free operation. The labor required in performing these functions increases the costs to a marked degree and therefore makes apparent the need for a construction wherein such costs will not constitute a major consideration.

In carrying out my invention I eliminate the primary disadvantage of high labor costs by taking advantage of the lesser expensive and advanced casting processes now employed by foundries. This has permitted development of a design wherein the cylinder and pins are cast as an integral unit with the separate collars and spacers being eliminated completely from the device. The housing plates are now made to the same size by the novel use of angled brackets which adapt the device to any size or design of tractor. Since thickness of parts can be accurately controlled during casting, the cylinder walls have been made thinner in those areas where the applied forces are at a minimum or non-existant.

While the specification concludes with claims particularly pointing out and distinctly claiming the subject matter which I regard as my invention, it is believed the invention will be better understood from the following description taken in connection with the accompanying drawing in which:

FIGURE 1 is a plan view in elevation, with parts broken away illustrating in full lines, the normal position of a tractor-trailer truck and by dotted lines, the position when in a jackknife position;

FIGURE 2 is a sectional view in elevation of a prior art anti-jackknifing device;

FIGURE 3 is a perspective view, with parts partly broken away, showing the improved safety-jackknife device of this invention;

FIGURE 4 is a sectional view in elevation of the device shown in FIGURE 3;

FIGURE 5 is a plan view of the device as applied to the frame of a tractor showing the position of the parts when the tractor and trailer are in alignment; and FIGURE 6 is a plan view of the device illustrated in FIGURE 5 but showing the position of the parts when the tractor-trailer is in a jackknifed position.

Referring now to the drawings wherein like reference characters designate like or corresponding parts throughout the several views, there is shown in FIGURES 3 and 4, perspective and sectional views of the newly designed cylinder and associated parts of the device. The cylinder 50 is of cast construction and includes having the cover plate 32 of FIGURE 2 constitute an integral part of the cylinder walls, thus eliminating the machining, welding and labor which heretofore was necessary to accurately mount the cover plate on the cylinder. The other end of the cylinder 50 is equipped with a thin plate 51 and gasket for preventing infiltration of corrosive matter into the cylinder areas housing the spring. The eye bolt 28 of shaft 26 and the parts associated therewith for holding the spring on the shaft are the same as those of the prior art device. Since this design lends itself to casting processes, the walls 52 on the left side of the cylinder shown in FIGURE 4 may be reduced substantially in thickness because it does not carry any load or absorb forces applied to the cylinder when the spring undergoes compression. Moreover, casting also permits the use of both a smaller diameter cylinder and spring because the cast walls can carry any loads expected to be encountered during operation.

The pins which heretofore were positioned in collars 38 and spacers 42 and then welded simultaneously to the cylinder, as described above, are now also cast integral with the cylinder. Because of this, the separate pairs of spacers and shoes are eliminated, and in particular, the special problem of fashioning the shoes to a curvature compatible with the rounded surface of the cylinder. The invention also eliminates the time previously necessary to align the parts, including the welding process formerly required to secure all the elements in a set position. In order to impart strength to the cylinder at the point where pins 54 project outwardly from the cylindrical surface, a section 56 having a thickness greater than the remaining cylinder walls is cast into the structure.

Since the pins make possible rotary movement of the cylinder in plates 34 and 36, small rings 58 are welded over openings cast in the cylinder walls as shown in both FIGURES 3 and 4. The inner surface of each ring includes material permanently lubricated with oil and thus forms a bearing in which the journals machined on the pins are adapted to rotate.

As suggested previously, the plates 34 and 36 supporting the cylinder and its associated parts were cut with a blow torch from standard steel sheets but because the upper plate was smaller than the lower, to permit adaptation to different size tractors, complete utilization of a whole sheet was not possible and substantial wastage of steel resulted. I overcome such wastage by cutting the plates to the same configuration and the same width. The lower plate preferably should be slightly longer to provide a longer weld when the device is installed between the tractor frames. This does not affect the economies however since the plate angles are all the same and long and short plates can be cut from the sheet in succession. Since the plates are of the same width, adapters 60, comprising U-shaped angle irons having a radius 61 formed in the forward end, are positioned between the upper and lower plates and the latter attached to the adapters by bolts 64 or other securing means. To accommodate tractors of different size, the adapters merely are moved inward or outward as necessary.

As is well known in the automotive field, the frame of vehicles of this type is heat treated and intense heat of the type generated during a welding process cannot be applied thereto. Therefore, in order to secure the safety-jackknife device in position in the frame, a channel shaped steel block 63 of untreated steel usually is bolted to each of the frame members 14 which extend rearwardly from the cab. The cross piece which normally joins the frame members 14 is removed and the safety-jackknife device located in the position previously occupied by the cross piece. The adapters 60 are moved outward to engage the steel block 63 and then tack welded thereto, as at 62, thus obtaining accurate alignment and positioning of the parts. An advantage of importance gained is that the safety-jackknife device and blocks can be removed and the welding process completed on a bench where the parts are conveniently accessible.

The above described redesign of the safety-jackknife device disclosed in my prior patents has effected economies of substantial proportions. As indicated previously, labor required for producing the prior art device constituted 3½ to 4 times the cost of material. In my new design disclosed herein, the labor costs now constitute approximately one-tenth the cost of materials. Moreover, the features of construction permit carrying the same loads with reduction in the size of the parts. Assembly of the device on a workbench allows for improved accuracy and better quality of work than was possible in the prior art design. Installation costs also are less because of the new use of adapters which permit the device to be mounted in any one of a number of tractors of different design.

FIGURES 5 and 6 show the disposition of the device when mounted in position and ready for operation. These plan views illustrate tractor frame members 14 supporting the fifth wheel 12 of conventional design which is engaged by pin 74 attached to the trailer 11 for assuring interlocking engagement between the tractor and trailer of a truck. A drive axle 76 connected with wheels 78, and springs 80, are all mounted on the frame members 14 in the usual manner. The safety-jackknife device is welded to the spaced and rearwardly extending frame members of the tractor thereby providing a structure having the same strength as when equipped with the cross piece.

FIGURE 5 illustrates the position of a tractor-trailer truck when both units are in alignment and in use. The spring 30 is in a relaxed condition, slack appears in chain 82 and the cylinder lies in the same axis as the truck center-line.

When a situation arises wherein the trailer commences moving out of alignment with the tractor, the slack in the chain starts to take up and the cylinder pivots in its bearings to follow trailer movement. As the trailer position continues to shift rapidly out of alignment, the chain tightens and sudden shock to the device and the frame of the tractor is minimized by the compressing action of the spring which absorbs the applied forces. When the maximum allowable angle is reached, further misalignment of the tractor and trailer is completely restricted, thus preventing the trailer from assuming an angle greater than that set by the parts.

Instances are known where the safety-jackknife device of this invention has operated successfully in preventing damage to the tractor-trailer truck and possible injury to the driver. However, to determine with certainty that the device was soundly engineered and would operate under the most adverse conditions, a tank truck of tractor-trailer design was chosen for the following tests. The trailer tank was filled with 6100 gallons of diesel oil representing approximately 50,000 lbs. and the brakes to the rear wheels of the trailer then disconnected so as to make them inoperative. The chain 16 was set to permit a maximum angle of 30 degrees between the tractor and trailer. With the truck in this condition, it was accelerated to 30 m.p.h. on a black-top highway covered with 2½ inches of snow. At this speed, the driver turned the front wheels rapidly to the right and then applied the brakes to the tractor to assure obtaining jackknifing of tractor and trailer. Immediately after this, the driver then re-applied power to the driving wheels and turned the front wheels to the left to pull the truck out of the jackknife condition, this latter maneuver being the remedy employed to bring any vehicle of this type back into alignment. When the tractor wheels were turned, the tractor of course followed but the trailer continued in the same direction. Tightening of the chain and full compression of the spring took place at the 30 degree angle and since power was being applied to the tractor rear wheels, the driver was able to drive the tractor into realignment with the trailer. Under similar conditions, a driver of a truck not having a safety-jackknife device, would not be able to effect such realignment because complete control is lost over the truck when the angle between the tractor and trailer exceeds approximately 15 degrees, and past this point, the trailer attempts to push the tractor completely around and in some cases, over-rides the tractor with consequent damage to the vehicle and possible injury to the driver. Use of the device constituting this invention eliminates this possibility.

In view of the above, it is apparent that many modifications and variations may be made in light of the above teachings. It therefore is to be understood that within the scope of the appended claims the invention may be practiced other than as specifically described.

What I claim as new and desire to secure by Letters Patent of the United States is:

1. A safety-jackknife device adapted for attachment to a tractor of a tractor-trailer truck comprising a pair of spaced parallel plates having aligned openings therein and a ring attached to the plates and positioned over said openings, a cast cylinder equipped with a slot in one end for receiving the shaft of an eye bolt located in the cylinder, a spring encompassing said shaft, integrally formed pins extending outwardly from the cylinder and designed to fit in the rings which constitute a bearing for permitting cylinder movement, and adjustable means positioned between the plates and adapted for attachment to the frame of the tractor for rigidly mounting the device in an immovable position.

2. The combination according to claim 1 wherein a section of material having a radial thickness greater than the remaining walls of the cylinder is located in the cylinder and at that point where the pins extend outwardly therefrom.

3. A safety-jackknife device for use with a tractor-trailer vehicle comprising a cast cylinder having a removable plate on one end and the other end equipped with an opening for accepting the shaft of an eye bolt positioned within the cylinder, a spring in the cylinder encompassing the shaft of the eye bolt, said cylinder further comprising walls having a thickness on one end sufficient to absorb forces which may be transmitted to the cylinder through the eye bolt and spring, a band of material integrally formed with a cylinder extending around the central part thereof and of a thickness greater than the walls of the cylinder, oppositely disposed pins projecting outwardly from said band of material, a pair of spaced parallel plates each having openings therein, a housing having an inner surface comprising a bearing arranged around the openings formed in each of said plates, a journal surface machined on said pins which are positioned in the bearing when the cylinder is mounted between said plates, and supporting members adjustably mounted between said plates and on opposite sides of the device and adapted to be welded to a supporting member on the frame of the tractor.

4. A safety-jackknife device adapted for use with a tractor trailer vehicle comprising a cast cylinder having a removable plate on one end and an opening formed in the other end which is cast integrally with the cylinder walls, an eye bolt having its shaft positioned in said cylinder and a spring encompassing the shaft, said cylinder walls being of a greater thickness in the central portion of the cylinder than the remaining walls thereof, pins integrally formed with the cylinder and at the points of greater wall thickness, a surface on the oppositely disposed pins providing a journal surface, a pair of spaced parallel plates including a bearing in which said journal surface is adapted for mounting and thereby permitting rotary movement of the cylinder, a pair of oppositely disposed adapters positioned between said plates and designed for adjustable movement therein for accommodating different size tractors, means securing said adapters to said plates, said adapters further providing an exposed surface for adapting the device to the frame of the tractor.

5. The combination according to claim 4 wherein the plates are of the same size.

References Cited in the file of this patent

UNITED STATES PATENTS

| 1,928,816 | Grayson | Oct. 3, 1933 |
| 1,991,684 | Ketel | Feb. 19, 1935 |
| 2,822,188 | Begin | Feb. 4, 1958 |

FOREIGN PATENTS

| 5134/26 | Australia | Sept. 21, 1927 |